United States Patent
Shen (10) Patent No.: US 11,539,496 B2
(45) Date of Patent: Dec. 27, 2022

(54) RESOURCE CONFIGURATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 17 days.

(21) Appl. No.: 16/988,015

(22) Filed: Aug. 7, 2020

(65) Prior Publication Data
US 2020/0366454 A1 Nov. 19, 2020

Related U.S. Application Data (63) Continuation of application No. PCT/CN2018/075841, filed on Feb. 8, 2018.

(51) Int. Cl.
| | | |
|---|---|---|
| H04W 56/00 | (2009.01) | |
| H04L 5/00 | (2006.01) | |
| H04W 76/27 | (2018.01) | |
| H04L 27/26 | (2006.01) | |
| H04W 72/04 | (2009.01) | |
| H04W 80/02 | (2009.01) | |

(52) U.S. Cl.
CPC .......... H04L 5/0092 (2013.01); H04L 5/0098 (2013.01); H04L 27/2607 (2013.01); H04W 72/042 (2013.01); H04W 76/27 (2018.02); H04W 80/02 (2013.01)

(58) Field of Classification Search
CPC . H04L 5/0092; H04L 5/0098; H04L 27/2607; H04W 76/27; H04W 72/042; H04W 80/02
USPC .......................................................... 370/329
See application file for complete search history.

(56) References Cited

U.S. PATENT DOCUMENTS

| | | | | |
|---|---|---|---|---|
| 2020/0163068 | A1* | 5/2020 | Takeda | ................ H04W 72/042 |
| 2020/0163113 | A1* | 5/2020 | Zhu | ........................... H04L 5/00 |
| 2020/0275417 | A1* | 8/2020 | Takeda | .................. H04L 5/0007 |
| 2021/0176757 | A1* | 6/2021 | Hwang | ............. H04W 72/0413 |

FOREIGN PATENT DOCUMENTS

CN 106455081 A 2/2017

OTHER PUBLICATIONS

Written Opinion of the International Search Authority in the international application No. PCT/CN2018/075841, dated Nov. 14, 2018.

(Continued)

Primary Examiner — Sai Ming Chan
(74) Attorney, Agent, or Firm — Ladas & Parry LLP (57) ABSTRACT

Disclosed in the present invention are a resource configuration method and device, and a computer storage medium. The method comprises: a terminal receiving first configuration information sent by a network device, the first configuration information at least comprising configuration information of a first bandwidth part (BWP), the configuration information of the first BWP comprising a plurality of numerologies corresponding to the first BWP.

24 Claims, 7 Drawing Sheets

(56) References Cited

OTHER PUBLICATIONS

"3rd Generation Partnership Project; Technical Specification Group Radio Access Network; NR; Physical layer procedures for control (Release 15)" 3GPP TS 38.213 V15.0.0 (Dec. 2017).
Huawei et al: "Resource allocation and indication for data channel", 3GPP Draft; R1-1705069, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), XP051243200, * paragraph [0002] *.
Intel Corporation: "Open issues for wider bandwidth operations", 3GPP Draft; R1-1710583, 3rd Generation Partnership Project (3GPP), Mobile Competence Centre; 650, Route Des Lucioles; F-06921 Sophia-Antipolis Cedex; France, vol. RAN WG1, No. Qingdao P.R. China; Jun. 27, 2017-Jun. 30, 2017, Jun. 26, 2017 (Jun. 26, 2017), XP051299790, *paragraph [0002] *.
Supplementary European Search Report in the European application No. 18905109.7, dated Dec. 1, 2020.
International Search Report in the international application No. PCT/CN2018/075841, dated Nov. 14, 2018.
"3GPP, Overall impact in RAN2 for BWP" 3GPP TSG RAN WG2 Meeting #99bis R2-1710592, Prague, Czech Republic, Oct. 9-13, 2017, Oct. 13, 2017 (Oct. 13, 2017), entire document.
"3GPP, Bandwidth part configuration and frequency resource allocation" 3GPP TSG RAN WG1 NR Ad-Hoc #2 R1-1710164, Qingdao, P. R. China Jun. 27-30, 2017, Jun. 30, 2017 (Jun. 30, 2017), entire document.
First Office Action of the European application No. 18905109.7, dated May 31, 2022.

* cited by examiner

A network device sends first configuration information to a terminal, wherein the first configuration information at least includes configuration information of a first BWP, and the configuration information of the first BWP includes a plurality of numerologies corresponding to the first BWP

| ...... | Resource allocation bit segment based on P1 | Resource allocation bit segment based on P2 | ...... |

FIG. 7

RESOURCE CONFIGURATION METHOD AND DEVICE, AND COMPUTER STORAGE MEDIUM

CROSS-REFERENCE TO RELATED APPLICATIONS

The present application is a continuation of International Application No. PCT/CN2018/075841 filed on Feb. 8, 2018, the contents of which are hereby incorporated by reference in its entirety.

BACKGROUND

In a Long Term Evolution (LTE) system, the frequency domain resources of a terminal are allocated in an entire of a system bandwidth. In a $5^{th}$ Generation (5G) New Radio (NR) system, because the system bandwidth is greatly increased, the transmission bandwidth of the terminal may only occupy a part of the system bandwidth.

In the current research of 5G NR, it has been decided to introduce the concept of a Bandwidth Part (BWP) to achieve frequency domain resource allocation in a smaller range than the system bandwidth. A base station may configure a plurality of BWPs through Radio Resource Control (RRC) signaling and then dynamically activate a BWP in Downlink Control Information (DCI). Each BWP is based on one numerology, wherein the numerology includes a subcarrier spacing and a Cyclic Prefix (CP). According to the current solution, only one BWP can be activated by a terminal, and when a new BWP is activated, the original BWP is deactivated.

Figure 1:
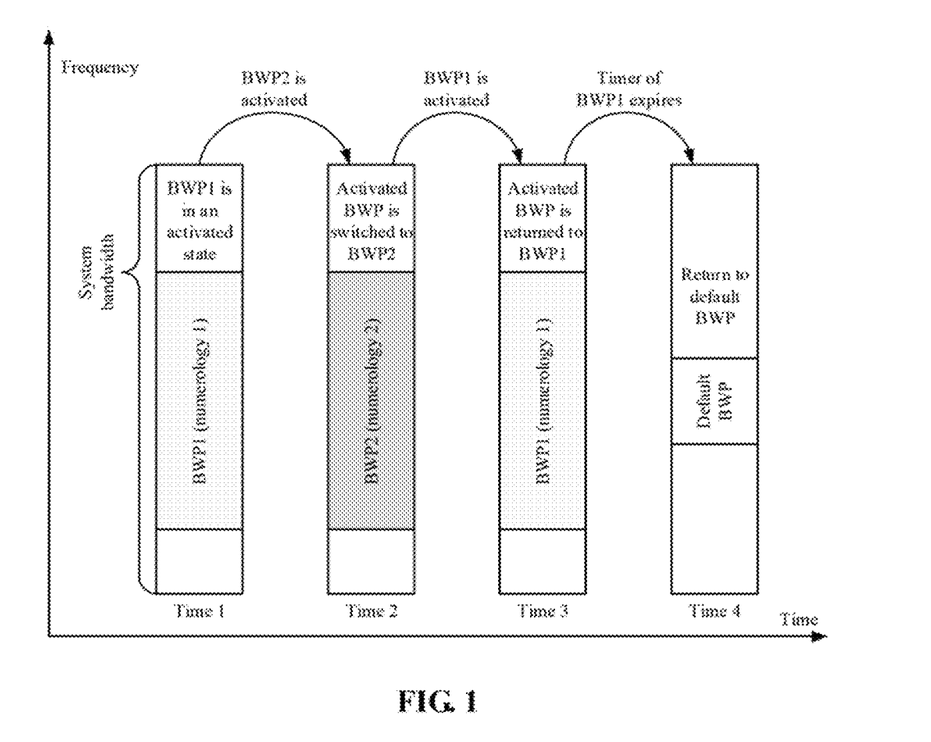
FIG. 1 is a schematic diagram showing that only one BWP can be in an activated state.

As shown in FIG. 1, when a BWP1 is in an activated state, if a BWP2 is activated, the BWP1 will be deactivated, and if the BWP1 is also deactivated, it will return to the default BWP.

Existing technical solutions cannot support simultaneous activation of a plurality of BWPs, therefore, simultaneous use of a plurality of numerologies cannot be supported, and the numerologies cannot be respectively optimized for different services when multiple types of services are transmitted in parallel. Furthermore, if switching is performed between two numerologies, it will also cause switching between two BWPs, thereby causing conversion of the radio frequency bandwidth of a terminal. The conversion of the radio frequency bandwidth will cause the terminal to be unable to receive or transmit data for a period of time, thereby causing waste of spectrum resources.

SUMMARY

The disclosure relates to the technical field of radio communications, and more particularly, to a resource configuration method and device, and a computer storage medium.

According to a first aspect of the embodiments of the disclosure, there is provided a resource configuration method, including: a terminal receives first configuration information sent by a network device, wherein the first configuration information at least includes configuration information of a first BWP, and the configuration information of the first BWP includes a plurality of numerologies corresponding to the first BWP.

According to a second aspect of the embodiments of the disclosure, there is provided a resource configuration method, including: a network device sends first configuration information to a terminal, wherein the first configuration information at least includes configuration information of a first BWP, and the configuration information of the first BWP includes a plurality of numerologies corresponding to the first BWP.

According to a third aspect of the embodiments of the disclosure, there is provided a resource configuration device, including a memory storing processor-executable instructions and a processor configured to execute the stored processor-executable instructions to perform an operation of: receiving first configuration information sent by a network device, wherein the first configuration information at least includes configuration information of a first BWP, and the configuration information of the first BWP includes a plurality of numerologies corresponding to the first BWP.

According to a fourth aspect of the embodiments of the disclosure, there is provided a resource configuration device, including a memory storing processor-executable instructions and a processor configured to execute the stored processor-executable instructions to perform an operation of: sending first configuration information to a terminal, wherein the first configuration information at least includes configuration information of a first BWP, and the configuration information of the first BWP includes a plurality of numerologies corresponding to the first BWP.

BRIEF DESCRIPTION OF THE DRAWINGS

The drawings described here are used to further understand the disclosure and form a portion of this application. The exemplary embodiments of the disclosure and the description thereof are used to explain the disclosure, and do not constitute an improper limitation on the disclosure. In the drawings.

DETAILED DESCRIPTION

In order to understand the features and technical contents of the embodiments of the disclosure in more detail, the implementation of the embodiments of the disclosure will be described in detail with reference to the accompanying drawings. The attached drawings are for reference only and are not intended to limit the embodiments of the disclosure.

Figure 2:
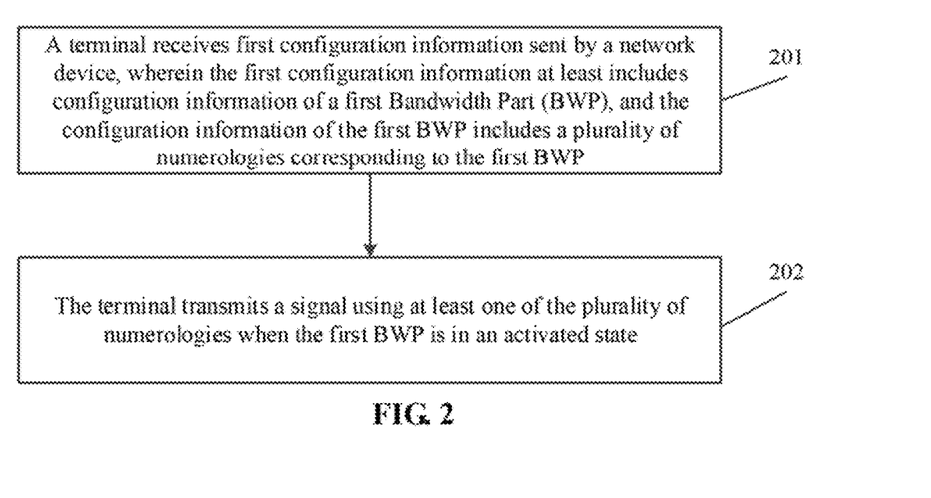
FIG. 2 is a first flowchart of a resource configuration method according to an embodiment of the disclosure.

FIG. 2 is a first flowchart of a resource configuration method according to an embodiment of the disclosure. As shown in FIG. 2, the resource configuration method includes an operation 201.

In the operation 201, a terminal receives first configuration information sent by a network device. The first configuration information at least includes configuration information of a first BWP, and the configuration information of the first BWP includes a plurality of numerologies corresponding to the first BWP.

In some embodiments of the disclosure, the terminal may be any device capable of communicating with the network, such as a mobile phone, a tablet computer, a notebook computer, a desktop computer, and the like.

In some embodiments of the disclosure, the network device may be a base station, such as a gNB of a 5G system.

In some embodiments of the disclosure, the numerology at least includes a combination of a subcarrier spacing and a cyclic prefix.

For example, a terminal receives, from a network device, first configuration information for configuring a BWP1. The first configuration information includes configuration information of a plurality of numerologies $P_1, \ldots, P_N$ (N>1) corresponding to the BWP1, where $P_i$ (i=1, 2, ..., N) represents a numerology.

In some embodiments of the disclosure, the first configuration information is RRC signaling or SI.

Further, the method further includes an operation 202.

In the operation 202, the terminal transmits a signal using at least one of the plurality of numerologies when the first BWP is in an activated state.

For example, the terminal may transmit a signal using any one of numerologies $P_1, \ldots, P_N$ when the BWP1 is in an activated state.

In some embodiments of the disclosure, the determination of the used numerology by the terminal may be implemented in the following two manners.

In manner 1, the terminal receives first control information sent by the network device. The first control information is used for scheduling resources, the first control information includes first indication information, and the first indication information is used for indicating at least one first numerology in the plurality of numerologies. The terminal determines, according to the first indication information, at least one first numerology used by the scheduled resources.

In an implementation mode, the first control information is DCI or MAC CE.

For example, a terminal receives, from a network device, first control information for scheduling resources. The first control information includes indication information of at least one of numerologies $P_1, \ldots, P_N$; and the numerology used by the scheduled resources is determined by the terminal according to the indication information.

In manner 2, the terminal receives first control information sent by the network device. The first control information is used for scheduling resources. The first numerology used by the scheduled resources is determined by the terminal based on a predetermined rule.

In an implementation mode, the first control information includes at least one resource allocation element, the resource allocation element being used for allocating resources based on numerologies. Allocated resources have correspondences with the numerologies. The first numerology used by the scheduled resources is determined by the terminal according to the at least one resource allocation element in the first control information.

In an implementation mode, the first control information is DCI or MAC CE.

For example, the first control information includes M resource allocation bit segments (0<M≤N) for allocation in turn of resources based on $P_1, \ldots, P_M$.

Figure 3:
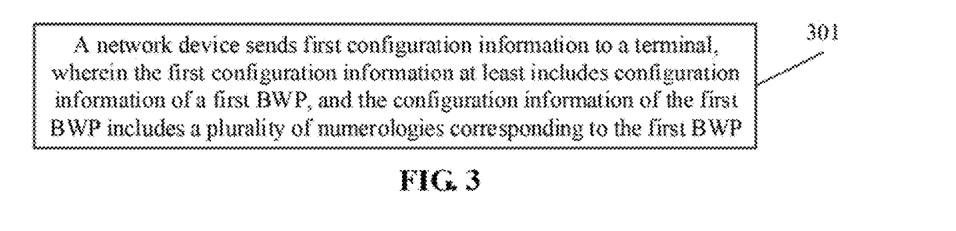
FIG. 3 is a second flowchart of a resource configuration method according to an embodiment of the disclosure.

FIG. 3 is a second flowchart of a resource configuration method according to an embodiment of the disclosure. As shown in FIG. 3, the resource configuration method includes an operation 301.

In operation 301, a network device sends first configuration information to a terminal. The first configuration information at least includes configuration information of a first BWP, and the configuration information of the first BWP includes a plurality of numerologies corresponding to the first BWP.

In an implementation mode, the network device sends first control information to the terminal. The first control information is used for scheduling resources, the first control information includes first indication information, and the first indication information is used for indicating at least one first numerology in the plurality of numerologies.

In an implementation mode, the network device sends first control information to the terminal. The first control information is used for scheduling resources. Further, the first control information includes at least one resource allocation element, the resource allocation element being used for allocating resources based on numerologies. Allocated resources have correspondences with the numerologies.

In some embodiments of the disclosure, the first control information is Downlink Control Information (DCI) or Media Access Control Control Element (MAC CE).

In some embodiments of the disclosure, the numerology at least includes a combination of a subcarrier spacing and a cyclic prefix.

In some embodiments of the disclosure, the first configuration information is Radio Resource Control (RRC) signaling or System Information (SI).

The technical solutions of the embodiments of the disclosure will be further described below in conjunction with specific application examples.

Example 1: Configuration and Activation of Multi-Numerology BWP

As shown in Table 1, the first configuration information configures four downlink BWPs. Each of a BWP2 and a BWP4 corresponds to one numerology, and when the BWP2 is activated, a terminal transmits a signal using a numerology 2. Each of a BWP and a BWP3 corresponds to two numerologies, and when the BWP1 is activated, a terminal transmits a signal using a numerology P1, using a numerology P2 or simultaneously using a numerology P1 and a numerology P2.

TABLE 1

Multi-numerology BWP configuration

| BWP ID | Frequency domain position | Bandwidth size | Numerology |
|---|---|---|---|
| BWP 1 | Frequency domain position 1 | Bandwidth size 1 | P1, P2 |
| BWP 2 | Frequency domain position 2 | Bandwidth size 2 | P2 |
| BWP 3 | Frequency domain position 3 | Bandwidth size 3 | P3, P4 |
| BWP 4 | Frequency domain position 4 | Bandwidth size 4 | P4 |

A BWP configuration method that supports a plurality of numerologies, provided by the embodiments of the disclosure, can support transmission of signals by a terminal using a plurality of numerologies simultaneously, thereby it is possible to flexibly support simultaneous transmission of multiple types of services, and thus improve the scheduling flexibility and spectrum utilization rate of the system.

Example 2: A Structure of DC for Resource Scheduling of Multi-Numerology BWP

Figure 4:
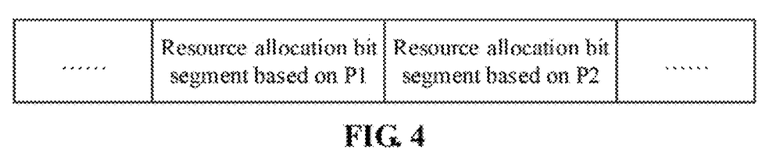
FIG. 4 is a schematic diagram of a DCI structure for resource scheduling of a multi-numerology BWP according to an embodiment of the disclosure.

As shown in FIG. 4, the DCI for resource scheduling of the BWP1 may include two bit segments for resource allocation, and a terminal acquires allocation information of resources based on P1 according to the first bit segment and acquires allocation information of resources based on P2 according to the second bit segment.

A BWP configuration method that supports a plurality of numerologies, provided by the embodiments of the disclosure, can support transmission of signals by a terminal using a plurality of numerologies simultaneously, thereby it is possible to flexibly support simultaneous transmission of multiple types of services, and thus improve the scheduling flexibility and spectrum utilization rate of the system.

Figure 5:
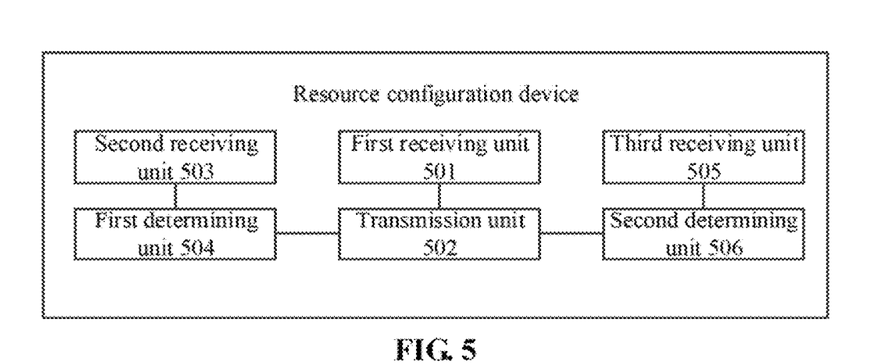
FIG. 5 is a first schematic structural composition diagram of a resource configuration device according to an embodiment of the disclosure.

FIG. 5 is a first schematic structural composition diagram of a resource configuration device according to an embodiment of the disclosure. As shown in FIG. 5, the resource configuration device includes a first receiving unit 501.

The first receiving unit 501 is configured to receive first configuration information sent by a network device. The first configuration information at least includes configuration information of a first BWP, and the configuration information of the first BWP includes a plurality of numerologies corresponding to the first BWP.

In an implementation mode, the device may further include a transmission unit 502.

The transmission unit 502 is configured to transmit a signal using at least one of the plurality of numerologies when the first BWP is in an activated state.

In an implementation mode, the device may further include a second receiving unit 503 and a first determining unit 504.

The second receiving unit 503 is configured to receive first control information sent by the network device, wherein the first control information is used for scheduling resources, the first control information includes first indication information, and the first indication information is used for indicating at least one first numerology in the plurality of numerologies.

The first determining unit 504 is configured to determine, according to the first indication information, the at least one first numerology used by the scheduled resources.

In an implementation mode, the device may further include a third receiving unit 505 and a second determining unit 506.

The third receiving unit 505 is configured to receive first control information sent by the network device, wherein the first control information is used for scheduling resources; and The second determining unit 506 is configured to determine, based on a predetermined rule, the first numerology used by the scheduled resources.

In an implementation mode, the first control information includes at least one resource allocation element, the resource allocation element being used for allocating resources based on numerologies. Allocated resources have correspondences with the numerologies.

The second determining unit 506 is configured to determine the first numerology used by the scheduled resources according to the at least one resource allocation element in the first control information.

In an implementation mode, the first control information is DCI or MAC CE.

In an implementation mode, the numerology at least includes a combination of a subcarrier spacing and a cyclic prefix.

In an implementation mode, the first configuration information is RRC signaling or SI.

Those skilled in the art should understand that the implementation functions of respective units in the resource configuration device as shown in FIG. 5 can be understood by referring to the related description of the above resource configuration method. The functions of respective units in the resource configuration device as shown in FIG. 5 may be implemented by programs running on a processor, or may be implemented by a specific logic circuit.

Figure 6:
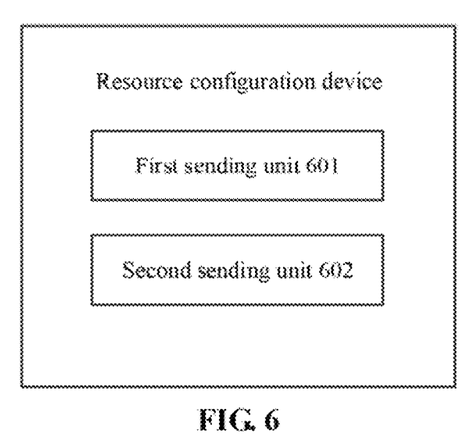
FIG. 6 is a second schematic structural composition diagram of a resource configuration device according to an embodiment of the disclosure.

FIG. 6 is a second schematic structural composition diagram of a resource configuration device according to an embodiment of the disclosure. As shown in FIG. 6, the resource configuration device includes a first sending unit 601.

The first sending unit 601 is configured to send first configuration information to a terminal. The first configuration information at least includes configuration information of a first BWP, and the configuration information of the first BWP includes a plurality of numerologies corresponding to the first BWP.

In an implementation mode, the device may further include a second sending unit 602.

The second sending unit 602 is configured to send first control information to the terminal. The first control information is used for scheduling resources, the first control information includes first indication information, and the first indication information is used for indicating at least one first numerology in the plurality of numerologies.

In an implementation mode, the device may further include a second sending unit 602.

The second sending unit 602 is configured to send first control information to the terminal. The first control information is used for scheduling resources.

In an implementation mode, the first control information includes at least one resource allocation element, the resource allocation element being used for allocating resources based on numerologies. Allocated resources have correspondences with the numerologies.

In an implementation mode, the first control information is DCI or MAC CE.

In an implementation mode, the numerology at least includes a combination of a subcarrier spacing and a cyclic prefix.

In an implementation mode, the first configuration information is RRC signaling or SI.

Those skilled in the art should understand that the implementation functions of respective units in the resource configuration device as shown in FIG. 6 can be understood by referring to the related description of the above resource configuration method. The functions of respective units in the resource configuration device as shown in FIG. 6 may be implemented by programs running on a processor, or may be implemented by a specific logic circuit.

If the foregoing resource configuration device according to the embodiment of the disclosure is implemented in a form of a software functional module and sold or used as an independent product, the device may also be stored in a computer-readable storage medium. Based on such an understanding, essential parts of the technical solutions of the embodiments of the disclosure or parts that contribute to the existing technology may be embodied in the form of a software product. The computer software product is stored in a storage medium, and includes a plurality of instructions for causing a computer device (which may be a personal computer, a server, or a network device, etc.) to perform all or part of the methods described in each embodiment of the disclosure. The foregoing storage medium includes: a U disk, a mobile hard disk, a Read Only Memory (ROM), a magnetic disk or an optical disk, and other media capable of storing program codes. In this way, the embodiments of the disclosure are not limited to any specific combination of hardware and software.

Correspondingly, embodiments of the disclosure further provide a computer storage medium in which computer executable instructions am stored. The above resource configuration method according to the embodiments of the disclosure may be implemented when the computer executable instructions are executed by a processor.

In the technical solutions of the embodiments of the disclosure, a terminal receives first configuration information sent by a network device, wherein the first configuration information at least includes configuration information of a first BWP, and the configuration information of the first BWP includes a plurality of numerologies corresponding to the first BWP. The terminal transmits a signal using at least one of the plurality of numerologies when the first BWP is in an activated state. By adopting the technical solutions of the embodiments of the disclosure, a BWP configuration method that supports a plurality of numerologies is provided. The method can support transmission of signals by a terminal using a plurality of numerologies simultaneously, thereby it is possible to flexibly support simultaneous transmission of multiple types of services, and thus to improve the scheduling flexibility and spectrum utilization rate of the system.

Figure 7:
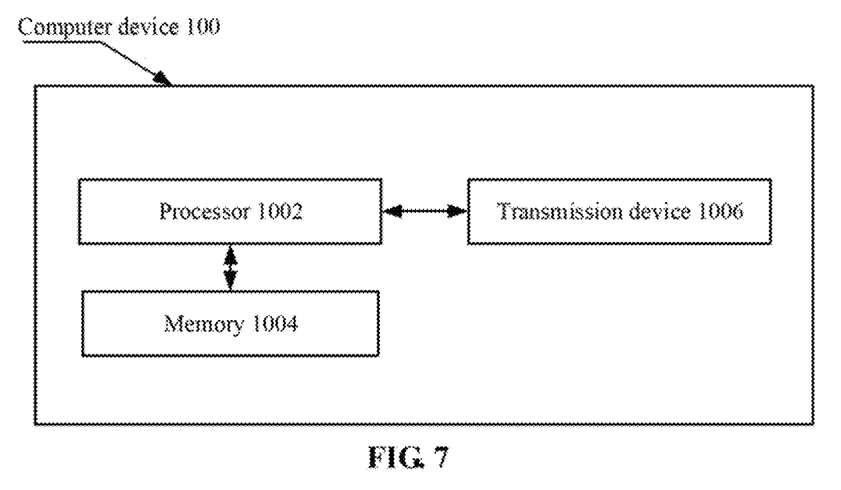
FIG. 7 is a schematic structural composition diagram of a computer device according to an embodiment of the disclosure.

FIG. 7 is a schematic structural composition diagram of a computer device according to an embodiment of the disclosure. The computer device may be a terminal and may also be a network device. As shown in FIG. 7, the computer device 100 may include one or more (only one shown in the figure) processors 1002 (the processor 1002 may include, but is not limited to, a Micro Controller Unit (MCU) or a Field Programmable Gate Array (FPGA) or other processing devices), a memory 1004 for storing data, and a transmission device 1006 for a communication function. Those of ordinary skill in the art can understand that the structure shown in FIG. 7 is only schematic, and does not limit the structure of the above electronic device. For example, the computer terminal 100 may further include components more or fewer than the components shown in FIG. 7, or have a different configuration from that shown in FIG. 7.

The memory 1004 may be configured to store software programs and modules of application software, such as program instructions/modules corresponding to the method in the embodiments of the disclosure. The processor 1002 executes various functional applications and data processing by running the software programs and modules stored in the memory 1004, thereby implementing the above method. The memory 1004 may include a high-speed random access memory, and may also include a non-volatile memory, such as one or more magnetic storage devices, flash memories, or other non-volatile solid state memories. In some examples, the memory 1004 may further include memories remotely set with respect to the processor 1002, and these remote memories may be connected to the computer device 100 through a network. The examples of the above network include but are not limited to the Internet, Intranet, local area networks, mobile communication networks, and combinations thereof.

The transmission device 1006 is configured to receive or transmit data through a network. The specific example of the above network may include a radio network provided by a communication supplier of the computer device 1. In an example, the transmission device 1006 includes a Network Interface Controller (NIC) which may be connected to other network devices through a base station so as to communicate with the Internet. In an example, the transmission device 1006 may be a Radio Frequency (RF) module configured to communicate with the Internet in a radio mode.

The technical solutions recited in the embodiments of the disclosure may be freely combined without conflicts.

In the several embodiments provided by the disclosure, it should be understood that the disclosed method and smart device may be implemented in other ways. The embodiments of the device described above are only exemplary. For example, the division of units is only a logical function division, and there may be other division modes in actual implementation. For instance, multiple units or components may be combined or may be integrated into another system, or some features may be ignored or not implemented. In addition, the coupling or direct coupling or communication connection between displayed or discussed components may be implemented through some interfaces, and the indirect coupling or communication connection between devices or units may be electrical, mechanical, or in other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit, and two or more than two units may also be integrated into a unit. The integrated unit may be implemented in a form of hardware and may also be implemented in a form of hardware and software functional units.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A resource configuration method, comprising:
receiving, by a terminal, first configuration information sent by a network device, wherein the first configuration information at least comprises configuration information of a first Bandwidth Part (BWP), and the configuration information of the first BWP comprises a plurality of numerologies corresponding to the first BWP;
receiving, by the terminal, first control information sent by the network device, wherein the first control information is used for scheduling resources, wherein the first control information comprises at least one resource allocation element, the resource allocation element being used for allocating resources based on numerologies, wherein allocated resources have correspondences with the numerologies; and determining, by the terminal based on a predetermined rule, a first numerology used by the scheduled resources.

2. The method of claim 1, further comprising:
transmitting, by the terminal, a signal using at least one of the plurality of numerologies when the first BWP is in an activated state.

3. The method of claim 2,
wherein the first control information comprises first indication information, and the first indication information is used for indicating at least one first numerology in the plurality of numerologies, and the method further comprises:
determining, by the terminal according to the first indication information, the at least one first numerology used by scheduled resources.

4. The method of claim 1, wherein
determining, by the terminal based on the predetermined rule, the first numerology used by the scheduled resources comprises:
determining, by the terminal, the first numerology used by the scheduled resources according to the at least one resource allocation element in the first control information.

5. The method of claim 3, wherein the first control information is Downlink Control Information (DCI) or a Media Access Control Control Element (MAC CE).

6. The method of claim 1, wherein the numerology at least comprises a combination of a subcarrier spacing and a cyclic prefix.

7. The method of claim 1, wherein the first configuration information is Radio Resource Control (RRC) signaling or System Information (SI).

8. A resource configuration method, comprising:
sending, by a network device, first configuration information to a terminal, wherein the first configuration information at least comprises configuration information of a first Bandwidth Part (BWP), and the configuration information of the first BWP comprises a plurality of numerologies corresponding to the first BWP; and
sending, by the network device, first control information to the terminal, wherein the first control information is used for scheduling resources, wherein the first control information comprises at least one resource allocation element, the resource allocation element being used for allocating resources based on numerologies, wherein allocated resources have correspondences with the numerologies.

9. The method of claim 8,
wherein the first control information comprises first indication information, and the first indication information is used for indicating at least one first numerology in the plurality of numerologies.

10. The method of claim 9, wherein the first control information is Downlink Control Information (DCI) or a Media Access Control Control Element (MAC CE).

11. The method of claim 8, wherein the numerology at least comprises a combination of a subcarrier spacing and a cyclic prefix.

12. The method of claim 8, wherein the first configuration information is Radio Resource Control (RRC) signaling or System Information (SI).

13. A resource configuration device, comprising:
a memory storing processor-executable instructions; and
a processor configured to execute the stored processor-executable instructions to perform an operation of:
receiving first configuration information sent by a network device, wherein the first configuration information at least comprises configuration information of a first Bandwidth Part (BWP), and the configuration information of the first BWP comprises a plurality of numerologies corresponding to the first BWP,
wherein the processor is configured to execute the stored processor-executable instructions to further perform operations of:
receiving first control information sent by the network device, wherein the first control information is used for scheduling resources, wherein the first control information comprises at least one resource allocation element, the resource allocation element being used for allocating resources based on numerologies, wherein allocated resources have correspondences with the numerologies; and
determining, based on a predetermined rule, a first numerology used by scheduled resources.

14. The device of claim 13, wherein the processor is configured to execute the stored processor-executable instructions to further perform an operation of:
transmitting a signal using at least one of the plurality of numerologies when the first BWP is in an activated state.

15. The device of claim 14, wherein
the first control information comprises first indication information, and the first indication information is used for indicating at least one first numerology in the plurality of numerologies, and the processor is configured to execute the stored processor-executable instructions to further perform operations of:
determining, according to the first indication information, the at least one first numerology used by the scheduled resources.

16. The device of claim 13, wherein
determining, based on the predetermined rule, the first numerology used by the scheduled resources comprises:
determining the first numerology used by the scheduled resources according to the at least one resource allocation element in the first control information.

17. The device of claim 15, wherein the first control information is Downlink Control Information (DCI) or a Media Access Control Control Element (MAC CE).

18. The device of claim 13, wherein the numerology at least comprises a combination of a subcarrier spacing and a cyclic prefix.

19. The device of claim 13, wherein the first configuration information is Radio Resource Control (RRC) signaling or System Information (SI).

20. A resource configuration device, comprising:
a memory storing processor-executable instructions; and
a processor configured to execute the stored processor-executable instructions to perform an operation of:
sending first configuration information to a terminal, wherein the first configuration information at least comprises configuration information of a first Bandwidth Part (BWP), and the configuration information of the first BWP comprises a plurality of numerologies corresponding to the first BWP,
wherein the processor is configured to execute the stored processor-executable instructions to further perform an operation of:

sending first control information to the terminal, wherein the first control information is used for scheduling resources, wherein the first control information comprises at least one resource allocation element, the resource allocation element being used for allocating resources based on numerologies, wherein allocated resources have correspondences with the numerologies.

21. The device of claim 20, wherein
the first control information comprises first indication information, and the first indication information is used for indicating at least one first numerology in the plurality of numerologies.

22. The device of claim 21, wherein the first control information is Downlink Control Information (DCI) or a Media Access Control Control Element (MAC CE).

23. The device of claim 20, wherein the numerology at least comprises a combination of a subcarrier spacing and a cyclic prefix.

24. The device of claim 20, wherein the first configuration information is Radio Resource Control (RRC) signaling or System Information (SI).

\* \* \* \* \*